United States Patent
Skelly et al.

(10) Patent No.: US 6,661,810 B1
(45) Date of Patent: Dec. 9, 2003

(54) CLOCK SKEW ESTIMATION AND REMOVAL

(75) Inventors: Paul Skelly, Needham, MA (US); Sue B. Moon, Amherst, MA (US); Don Towsley, Amherst, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/273,001

(22) Filed: Mar. 19, 1999

(51) Int. Cl.$^7$ .................................................. H04J 3/07

(52) U.S. Cl. ..................................................... 370/516

(58) Field of Search ................................ 370/516, 503, 370/509, 507, 517, 518, 519, 252; 375/371; 348/497; 709/248

(56) References Cited

U.S. PATENT DOCUMENTS

| 5,477,531 A | * | 12/1995 | McKee et al. | ............... 370/249 |
| 6,259,677 B1 | * | 7/2001 | Jain | ........................... 370/252 |
| 6,327,274 B1 | * | 12/2001 | Ravikanth | ................... 370/516 |
| 6,470,483 B1 | * | 10/2002 | Rodriguez et al. | ............. 716/6 |

OTHER PUBLICATIONS

D. Hoaglin, F. Mosteller, and J. Tukey, editors, Understanding Robust and Exploratory Data Analysis, John Wiley & sons, 1983, pp. 404–431; pp. 297–339.

M.E. Dyer, Linear Algorithm for Two– and Three–Variable Linear Programs, SIAM Journal on Computing, 13:31–45, 1983.

Hans Eriksson, MBONE: the Multicast Backbone, Communications of ACM, 37(8), Aug. 1994.

S. Deering and R. Hinden, Internet Protocol, Version 6 (Ipv6) specification, RFC 1883, Internet Engineering Task Force, Dec. 1995.

Sudhir Dixit and Paul Skelly, MPEG–2 over ATM or Video Dialtone Networks: Issues and Strategies, IEEE Network, 9(): 30–40, Sep.–Oct. 1995.

N. Megiddo, Linear Time Algorithm for Linear Programming in $r^3$ and Related Problems, SIAM Journal on Computing, 12(4): 759–776.

D. Mills, Modeling and Analysis of Computer Network Clocks, Technical Report 92–5–2, Electrical Engineering Department, University of Delaware, May 1992.

Sue B. Moon, Jim Kurose, and Don Towsley, Packet Audio Playout Delay Adjustment: Performance Bounds and Algorithms, ACM/Springer Multimedia Systems, 5:7–28, Jan. 1998.

V. Paxson, G. Almes, J. Mahdavi, and M. Mathis, Framework for IP Performance Metrics, RFC 2330, Internet Engineering Task Force, May 1998.

Vern Paxson, On Calibrating Measurements of Packet Transit Times, In Proceedings of Signetrics '98, Madison, Wisconsin.

Ramachandran Ramjee, Jim Kurose, Don Towsley, and Henning Schulzrinne, Adaptive Playout Mechanisms for Packetized Audio Applications in Wide–Area Networks, In Proceeding of INFOCOM '94, 1994.

(List continued on next page.)

*Primary Examiner*—Chi Pham
*Assistant Examiner*—Alexander O. Boakye
(74) *Attorney, Agent, or Firm*—Leonard Charles Suchyta; James K. Weixel

(57) ABSTRACT

Provided herein is a linear programming-based algorithm to estimate the clock skew in network delay measurements based on one-way delay measurements. The algorithm has the time complexity of O(N), leaves the delay after the skew removal positive, and is robust in the sense that the error margin of the skew estimate is independent of the magnitude of the skew. The algorithm is understood to be unbiased, and the sample variance of the skew estimates is small.

24 Claims, 8 Drawing Sheets

OTHER PUBLICATIONS

Sue B. Moon, Paul Skelly, and Don Towsley, "Estimation and Removal of Clock Skew from Network Delay Measurements", Technical Report 98–43, Department of Computer Science, University of Massachusetts at Amherst.

Paul Skelly and Man Li, EIPMon: An EIP Monitoring Tool.

David L. Mills, Network time protocol NTP (version 3): Specification, implementation and analysis, RFC 1305, Network Information Center, SRI International, Menlo Park, CA May 1992.

Henning Schulzrinne, RTP profile for audio and video conferences with minimal control, RFC 1890, Internet Engineering Task Force, Jan. 1996.

Henning Schulzrinne, Steve Casner, R. Frederick, and Van Jacobson, RTP: A transport protocol for real–time applications, RFC 1889, Internet Engineering Task Force, Jan. 1996.

Vern Paxson, Measurements and Analysis of End–to–End Internet Dynamics, PhD thesis, University of California, Berkeley, 1997.

* cited by examiner

1. PROCEDURE: IN $(\vec{d}_i, \vec{ts}_i, N)$ OUT $(\hat{\alpha}, \hat{\beta})$
2. // line(slope, y-intercept) returns a line.
3. // x(line1, line2) and y(line1, line2) return x- and y-coordinates of intersection.
4. $n_1 = 1, n_2 = 2, k = 2$
5. FOR $i = 3$ to $N$
6.    FOR $j = k$ downto $2$
7.       IF $x(line(\vec{ts}_i, -\vec{d}_i), line(\vec{ts}_{n_j}, -\vec{d}_{n_j})) > x(line(\vec{ts}_{n_j}, -\vec{d}_{n_j}), line(\vec{ts}_{n_{j-1}}, -\vec{d}_{n_{j-1}}))$
8.          BREAK;
9.       ENDIF
10.    ENDFOR
11.    // Note that $j$ is 1 when the FOR loop in line 6 runs to the end.
12.    $k = j + 1, n_k = i$
13. ENDFOR
14. $opts = \sum_i \vec{ts}_i / N$
15. FOR $i = 1$ to $k - 1$
16.    IF $(\vec{ts}_{n_i} < opts)$ AND $(opts < \vec{ts}_{n_{i+1}})$
17.       $\hat{\alpha} - 1 = x(line(\vec{ts}_{n_i}, -\vec{d}_{n_i}), line(\vec{ts}_{n_{i+1}}, -\vec{d}_{n_{i+1}}))$,
18.       $\hat{\beta} = y(line(\vec{ts}_{n_i}, -\vec{d}_{n_i}), line(\vec{ts}_{n_{i+1}}, -\vec{d}_{n_{i+1}}))$,
19.       BREAK;
20.    ENDIF
21. ENDFOR
22. ENDPROCEDURE

FIG. 8

CLOCK SKEW ESTIMATION AND REMOVAL

GOVERNMENT FUNDING

This research was supported in part by funding from the National Science Foundation under Grant No NCR-9508274.

DESCRIPTION OF RELATED ART

The advent of computer networks has enabled a wide range of distributed computing applications. Among other things, computer networks allow users to access, store and manipulate data that is located in remote locations, to share data and applications from remote locations, and to communicate between remote locations. The effectiveness of these and other aspects of computer networks depends on network performance. Therefore network performance metrics have been developed to assist network engineers in analyzing and improving performance of networks and applications that take advantage of networks. End-to-end delay and loss traces are frequently used in analyzing the network performance. The accuracy of such measurements is important for several reasons. First, end-to-end measurements may be the only way of measuring network performance, especially when there is no provision inside the network to provide end-systems with information about the current status of the network. The current Internet has no mechanism for providing feedback on network congestion to end-systems at the IP layer, and neither does the Internet Protocol version 6 specification. Second, protocols and applications that behave adaptively at the end-system base their control on observed network performance, and it is critical that they obtain correct measurements.

Packet loss can be detected if a sender puts a sequence number on every packet it sends out, and the receiver sees a gap in the sequence numbers of packets arriving within a reasonable amount of time. For delay measurements, a sender needs to add time stamps to packets for a receiver to gather delay information. Since the clocks at both end-systems are involved in measuring delay, the synchronization between the two clocks becomes an issue in the accuracy of delay measurement. The Network Time Protocol (NTP) is widely used on the Internet for clock m synchronization, and provides accuracy in the order of milliseconds under reasonable circumstances. The accuracy, however, is not guaranteed, and not all hosts on the Internet support it.

Packet loss and delay are crucial in understanding the performance and reliability of the Internet and other computer networks. To provide unbiased and quantitative measures of performance, there has been much effort to define one-way loss and delay metrics. To obtain an accurate measurement of one-way delay, errors and uncertainties related to clocks need to be accounted for. When two clocks involved in the measurement run at different frequencies (that is, have a clock skew), inaccuracies are introduced in the measurement.

Methods and systems have been proposed to measure clock skew based on end-to-end delay measurements with respect to transmission times between a sender system with a sender clock and a receiver system with a receiver clock. Such methods typically rely on the fact that the minimum observed delay increases or decreases over time, depending on whether a receiver clock is faster or slower in frequency than a sender clock. The rate of increase of the minimum observed delay, which can be graphically represented as the slope of the minimum observed delay plotted against the time of transmission, is the difference in frequency, or the skew, between the clocks.

Known estimation methods for the clock skew include the work of Vern Paxson in a Ph.D. thesis, University of California, Berkeley, 1997, entitled Measurements and Analysis of End-to-End Internet Dynamics, and in an article entitled On Calibrating Measurements of Packet Transit Times, published in Proceedings of SIGMETRICS '98, Madison, Wis., June 1998. The disclosure of such thesis and paper are incorporated by reference herein. The Paxson algorithm uses forward and reverse path measurements of delay between a pair of hosts to deal with clock synchronization problems. The Paxson algorithm relies on robust line fitting based on robust statistics. It uses the median as a robust estimate for the slope. De-noised one-way transit times and cumulative minima are used in the algorithm. The algorithm can be extended to use with one-way delay measurements. In particular, for N delay measurements, the measured delays can be partitioned into √N segments, and the minimum delay measurement can be picked from each segment. The selected measurements are the "de-noised" one-way transit times (OTTs). Next, the user can pick the median of the slopes of all possible pairs of de-noised OTTs. If the median slope is negative, the user can assume a decreasing trend. Next, the user can select a cumulative minima test from the de-noised OTTs and test whether the number of cumulative minima is large enough to show that the decreasing trend is probabilistically not likely, if there is no trend. If the cumulative minima test is passed, then the user can pick the median from the slopes of all possible pairs of the cumulative minima and output it as the estimate of the ratio of the frequencies of the two clocks minus one.

Other known techniques include linear regression, in which a line is fit to the delay data points by minimizing the sum of squares of the distances between the line and the data points. Also, a piecewise minimum algorithm is known that partitions the delay into segments, picks a minimum from each segment, and connects them to obtain a concatenation of line segments. The minima are the same as the "de-noised" one-way transit times of the Paxson algorithm. The resulting concatenation of line segments is an estimate of the skew.

Known algorithms are either quite complex, unreliable in certain cases, or both. Accordingly, a need exists for a simple, efficient, reliable measurement of clock skew that can be obtained from one-way delay measurements.

SUMMARY

Provided herein is a linear programming-based algorithm to estimate the clock skew in network delay measurements based on one-way delay measurements. The algorithm has the time complexity of O(N), leaves the delay after the skew removal positive, and is robust in the sense that the error margin of the skew estimate is independent of the magnitude of the skew. The algorithm is understood to be unbiased, and the sample variance of the skew estimates is small.

Provided herein are methods and systems for estimating the skew between a sender clock and a receiver clock on a network. The methods may include, for a set of packets sent over a network, obtaining a set of measurements consisting of the time duration between a first packet's departure and each subsequent packet's departure consistent with the time measured by a sender clock, obtaining a calculated set of delay measurements consisting of the amounts determined by subtracting the time duration between the first packet's departure and each subsequent packet's departure as measured by the sender clock from the time duration between the first packet's arrival and each subsequent packet's arrival as measured by the receiver clock, defining a feasible region of solution for an estimate a of the ratio between the speed of the sender clock and the speed of the receiver clock and for an estimate p of the end-to-end delay of the first packet consistent with the receiver clock, wherein the feasible region is defined by the following condition:

$$\bar{d}_i - (\hat{\alpha}-1)\bar{t}_i^s + \beta \geq 0,\ 1 \leq i \leq N$$

and minimizing the vertical distance between the line and all delay measurements according to the formula $$\min\left\{\sum_{i=1}^{N}(\bar{d}_i - (\hat{\alpha}-1)\bar{t}_i^s + \beta)\right\}.$$

The methods may further include eliminating the requirement that certain constraints be examined in processing by using the data point for the immediately prior packet as the minimum delay between the sender clock and the receiver clock for a subsequent packet.

The methods may further include for a data set of transmissions of different packet sizes, determining the mode packet size for the set of transmissions and using only measurements of transmissions of packets of the mode packet size in defining the feasible region and minimizing the distance between the line and the delay measurements.

Methods and systems are provided herein for estimating clock skew from network delay measurements, comprising, measuring the end-to-end delay for a plurality of transmissions over a plurality of time periods between a sender and a receiver to obtain a plurality of minimum delay data points and fitting a line by minimizing the vertical distance between the line and all delay measurements.

BRIEF DESCRIPTION OF FIGURES

FIG. 8 depicts pseudocode for a linear programming method and system.

DETAILED DESCRIPTION

Figure 1:
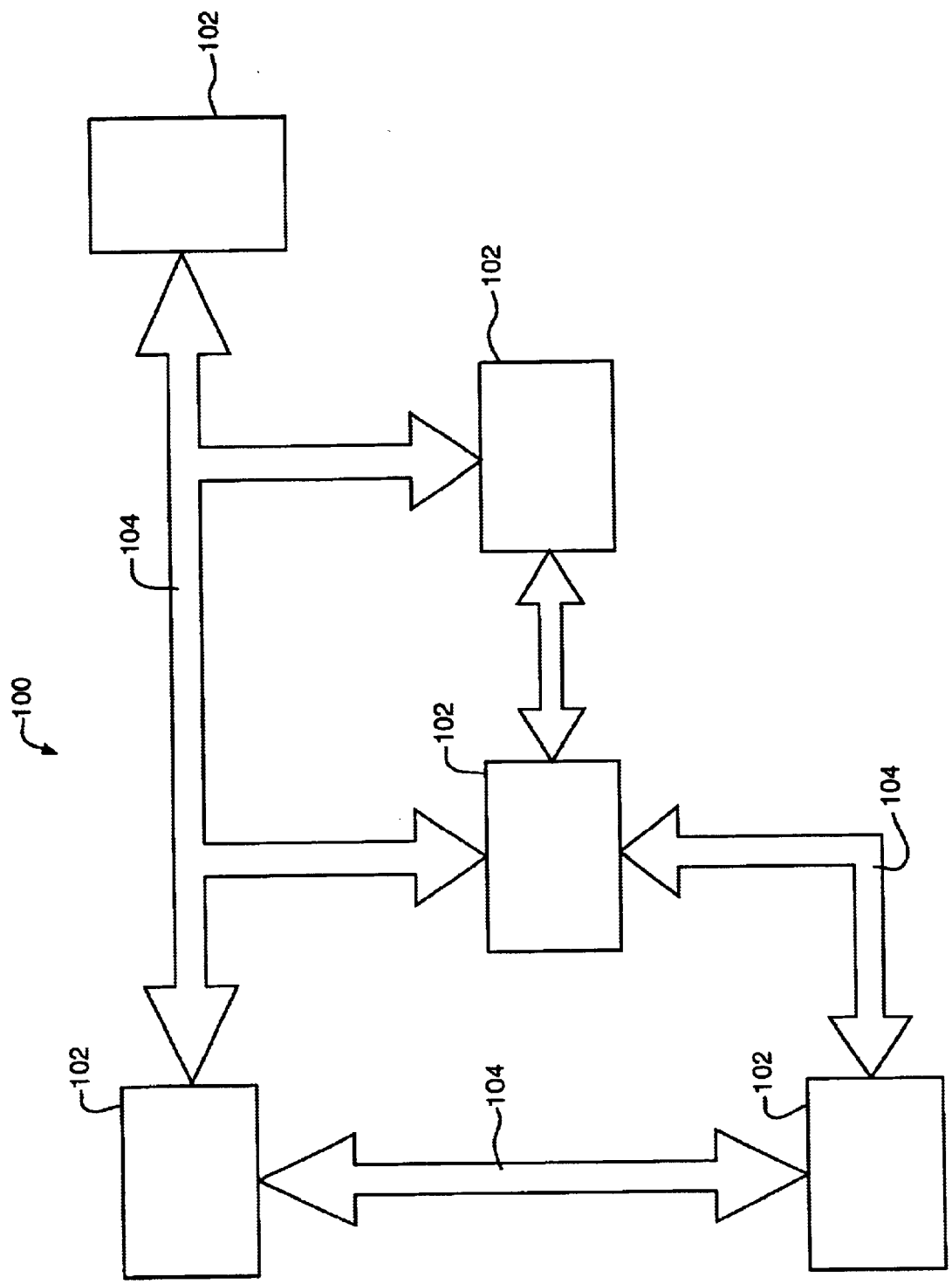
FIG. 1 depicts a computer network consisting of a data connection and a plurality of linked devices.

Referring to FIG. 1, a network 100 is depicted, in which a plurality of devices 102 are connected by a data connection 104. The data connection 104 may include a plurality of different paths that link the various devices 102 to form the network 100. The data connection 104 may be any data connection 104 capable of carrying data between devices, ranging from wiring, T1 lines, fiber optics, or cable to radio frequency, cellular, or other transmissions. In an embodiment, the network 100 is the Internet, but the network 100 could be an intranet, local area network, wide area network, or other network that includes a plurality of devices. The devices 102 may communicate with each other over the network 100 via any known protocol. In an embodiment, the protocol is IP. The devices 102 may be any devices capable of communication over the network 100. In embodiments, the devices 102 are computers, which may be personal computers, laptop computers, servers, workstations, main frame computers, web televisions, and client computers.

Figure 2:
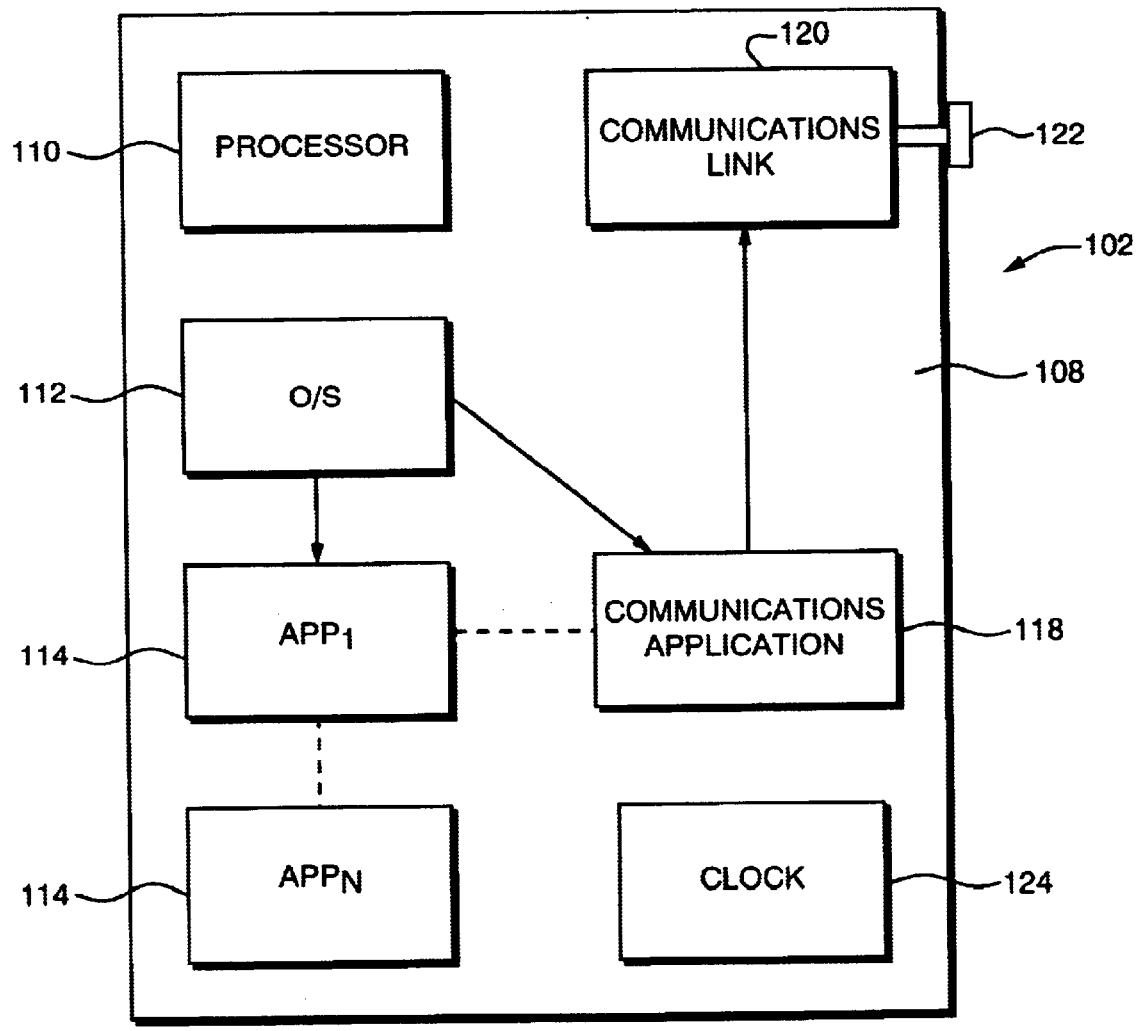
FIG. 2 depicts a typical device that may be connected to a network.

A schematic for a device 102 is provided in FIG. 2. In this embodiment, the device is a personal computer 108. The computer 108 may include a processor 110, such as an Intel pentium-based processor, which may operate in conjunction with an operating system 112, which may be an operating system such as the Windows®, Macintosh®, or Linux® or other Unix operating systems. The operating system 112 may control one or more applications 114, one or more of which may be a communications application 118. The communications application 118 may include functions that permit the device 102 to communicate with another device 102 over the network 100 using the data connection 104. The communications application 118 may control, for example, a communications link 120, such as a modem, cable modem, or similar device, which may be connected by a connector 122 to the data connection 104 of the network 100. The connector 122 may be a computer port, a telephone line, a cable connection, a network interface card, or other device or method for connecting a device. The communications link 120 could also be a transmitter/receiver for wireless communication, such as a cellular connection, radio connection, or the like. Communication with another device 102, as controlled by the communications application 118, may be for any purpose, such as sending or receiving electronic mail, access to the worldwide web, remote control of an external computer, transmission of files and data, distributed computing, sharing of applications, multi-user applications, virtual reality, computer games, real-time simulations, combat simulations, distance learning, voice, audio, video and other data transmission, for example.

The computer 108 may further include a clock 124. The clock 124 provides a timing reference for the processor 110 for any application or processing function that requires timing. For example, one or more software applications 114 may require timed interrupt cycles. The processor 110 can time the interrupt cycles by reference to a signal from the clock 124. The clock may be any known clock suitable for use with a computer 108 or other network device 102. In embodiments, the clock 124 may be an oscillator, such as a crystal, that oscillates at a known frequency. The clock 124 may then send period signals to the processor 110, which may "count" the oscillations in order to determine passage of an amount of time.

Some types of communications applications 118 may be relatively insensitive to timing. For example, transmission of a text document to another computer merely requires that the file be formatted in a suitable manner for transmission over the data connection 104 of the network 100, transmitted over the data connection 104 and downloaded by another device 102. As long as both devices 102 are connected in the network 100, the transmission does not require precise timing.

Figure 3:
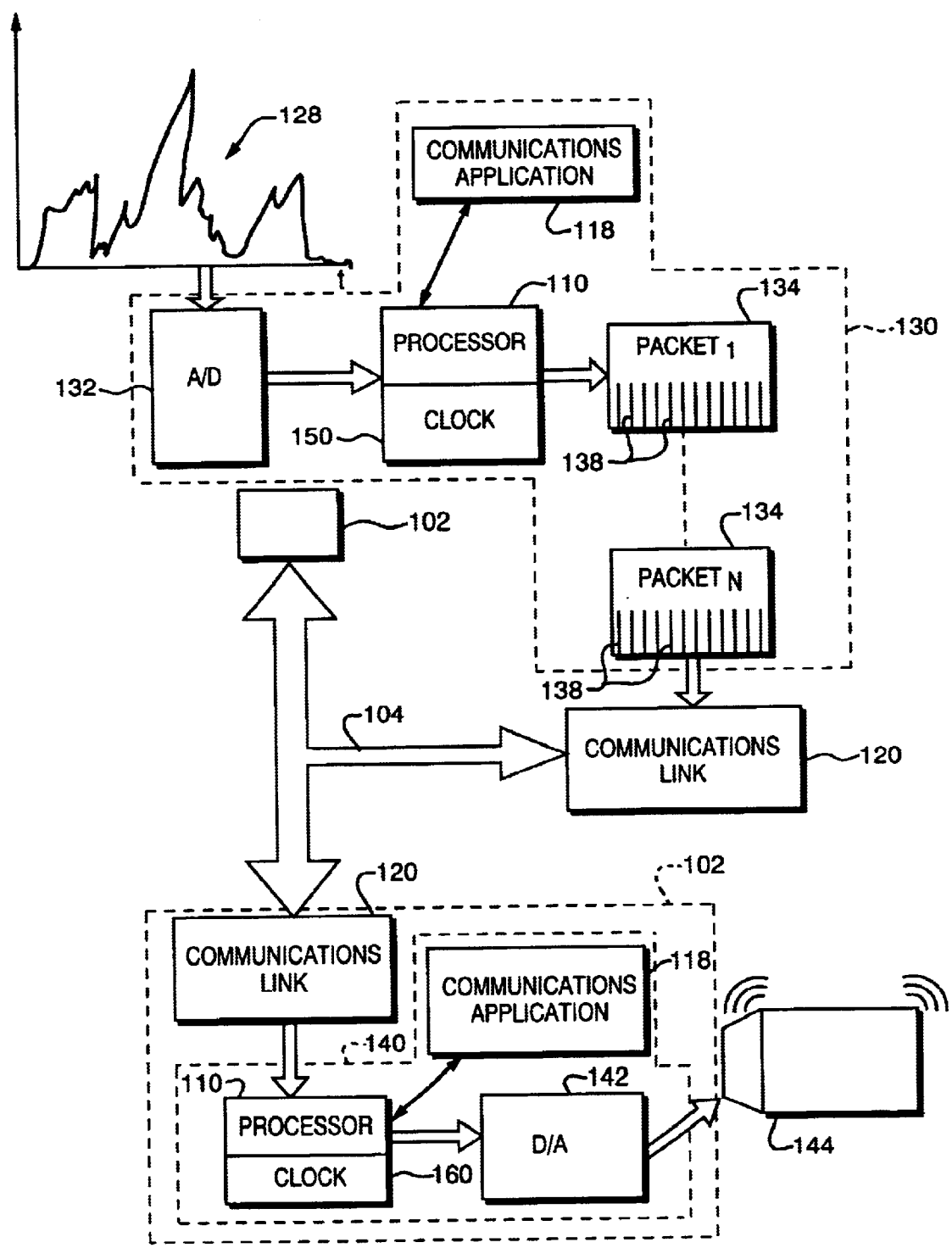
FIG. 3 depicts a schematic of a real-time communications application using a computer network such as that depicted in FIG. 1.

Other communications applications 118 may be quite sensitive to timing. Referring to FIG. 3, a schematic for a communications application 118 is provided. In the embodiment depicted in FIG. 3, a system for transmitting real-time audio signals is depicted. In this embodiment, an audio signal 128 is encoded into data packets by an encoder 130. The encoder 130 may include an analog-to-digital converter 132, which converts the audio signal into a digital signal in a conventional manner. The analog-to-digital converter 132 may supply a signal to the processor 110. The communications application 118 may also cause the processor 110 to call on a timing reference signal from a sender clock 150, which may be associated with the incoming stream of digital data from the analog-to-digital converter. The sender clock 150 may be of any type, such as the clock 124 depicted in connection with FIG. 2. The communications application 118 may cause the processor to output the audio signal 128 into a series of packets 134, consisting of digital bits 138. One or more of the bits 138 may be a timing bit, which indicates the timing of the audio signal 128 that is encoded in that packet. The encoded packets 134 are then directed by the communications application 118 from the encoder 130 to the communications link 120, through which they are transmitted over the data connection 104 of the network 100 to one or more other devices 102. In one or more such other devices 102, a communications link 120 may send the encoded packets 134 to a decoder 140, which may include a processor 110 running in connection with a communications application 118. The communications application 118 may direct the processor 110 to call on a reference signal from a receiver clock 160 of the receiving device 102. The timing reference signal may be used by the processor to time the output of the data packets 134, which may be sent to a digital-to-analog converter 142 for further transmission to an audio device 144, such as a radio or entertainment system, a receiver, or speakers associated with the device 102. In particular, the timing reference signal may be compared to the timing instructions included in the packets 134, which each package being output at the time indicated in the packet 134, as determined by reference to the receiver clock 160.

The transmission of the packets 134 over the data connection 104 and the processing by the encoder 130 and decoder 140 create delay. In order to establish real-time playback by the audio device 144 of the audio signal 128, the delay must be accounted for. If the delay were fixed, then playback would simply be delayed, but the relative timing of data packets 134 would not be affected. However, network delay may vary significantly, particularly if different transmissions of packets 134 have different queuing delays. The decoder 140 can account for different delays by referring to the timing bits of the packets 134, which indicate the relative timing of the packets 134 as determined by reference to the sender clock 150. The receiver clock 160 can then be used to time the packets, regardless of the change in the network delay. Since the relative timing of the packets 134 may be more important than the absolute timing (because some delay is inherent in the network 100 and must be accounted for anyway), it does not matter that the sender clock 150 and the receiver clock 160 may reflect different times. However, if the sender clock 150 and the receiver clock 160 not only reflect different times, but run at different rates, then significant problems may arise. Among other things, when the decoder 140 obtains a timing reference from the receiver clock 160 and applies it to the packets 134, the packets 134 will not be output at the same relative times as they were input in the encoder 130. Depending on how different the rates of the clocks 150, 160 are, the output may be significantly mis-timed, causing significant deterioration in the quality of the real-time audio output, including problems such as hiccups and buffer overflow resulting in data loss.

The difference in clock rates is known as "skew." The example depicted in connection with FIG. 3 is only one of many problems that can occur in network environments due to clock skew. Clock skew can cause problems in all end-to-end network delay measurements, and such measurements are used for a variety of purposes. Packet delay and loss traces are frequently used by network engineers, as well as network applications, to analyze network performance. The clocks on the end-systems used to measure the delays, however, are not always synchronized, and this lack of synchronization reduces the accuracy of these measurements. The problem of clock skew is not merely academic; in fact, clock skews of a magnitude significant enough to cause deterioration in transmission quality are very common. Therefore, estimating and removing relative skews and offsets from delay measurements between sender and receiver clocks are critical to the accurate assessment and analysis of network performance.

Another application in which timing is critical is timing recovery for video transmissions, such as MPEG-2 video transmissions that are transported over packet networks. Video transmissions are particularly sensitive to timing, and sputter or data loss can significantly impact video quality. Accordingly, accurate measurement of clock skew between sender and receiver systems is desirable in order to permit timing recovery for video packet transmissions.

Another area in which significant clock skews may have a deleterious effect is that of multi-user applications, including distributed, multi-user applications. A multi-user application is a computer program run on a computer system that allows multiple participants, who may be geographically distributed, to interact with the computer program and other users in an environment, typically via communication links. Examples of multi-user applications are multi-player computer games, real-time combat simulations, flight simulations, driving simulations, and any virtual reality applications involving multiple users. Multi-user applications may permit multiple users to interact with each other within an environment. For example, in an air combat simulation, each participant may pilot an aircraft in an airspace and engage in combat with other participants. Realistic simulations and virtual reality experiences depend significantly on the timing of data transmissions among the computer systems of the geographically distributed users and the computer system of the host environment. The presence of significant clock skew among the multiple systems, by contributing to buffer overflow, data loss, and mis-timing of data, may degrade the quality of a simulation, which is highly dependent on the relative timing of packets among the various users. Accordingly, efficient, accurate estimation of clock skew is desirable in order to permit timing adjustments that improve the relative packet timing for the real-time data stream.

When clock skew is well-estimated, it is possible to account for the estimated amount of the skew in applications that depend on precise timing. For example, the processor 110 may be programmed to account for an estimated; that is, if the differences in the rates of the sender clock 150 and the receiver clock 160 are estimated, then algorithms can be established to provide improved timing with respect to transmissions of the packets 134.

However, measurement of clock skew is complicated by a number of factors. Among these factors are the fact that different packets may take different paths through a network between two devices, that different size packets are transmitted at different rates, that network queues may contribute a variable component to the delay, that many transmissions are uni-directional, meaning that no signal is returned to the sender from the receiver, and that the skew between different hosts will be different. Clock skew estimation methods and systems attempt to overcome these complications and provide reliable estimates of clock skew from end-to-end measurements of network delay.

Figure 4:
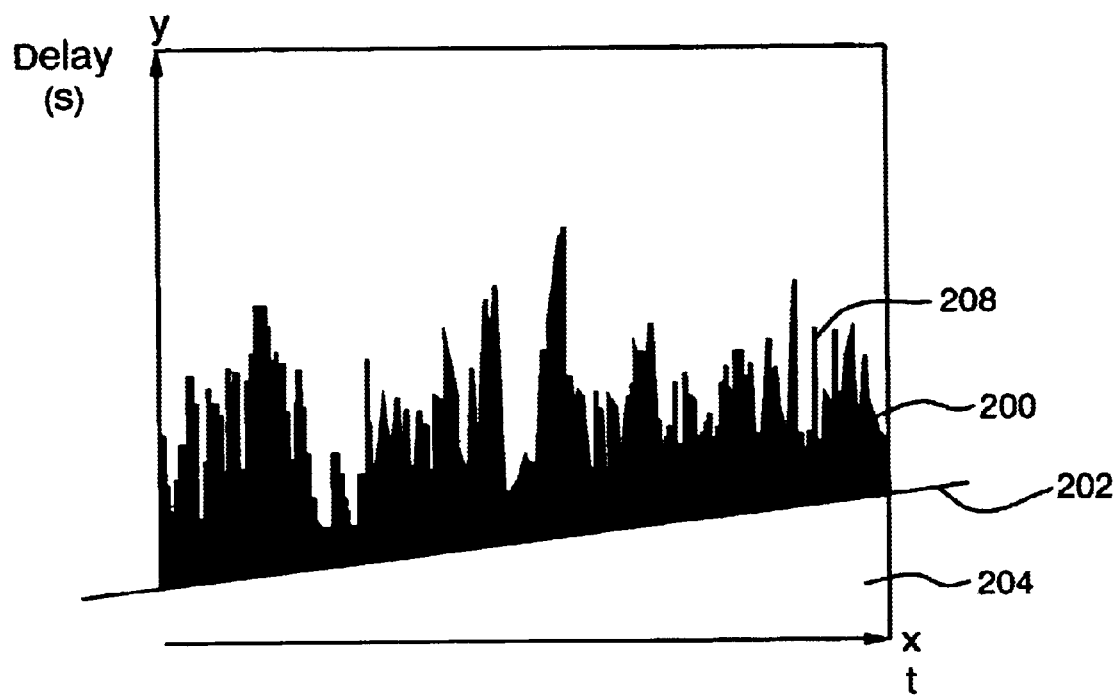
FIG. 4 depicts a schematic of end-to-end delay measurements from a hypothetical set of computer network transmissions.
Figure 5:
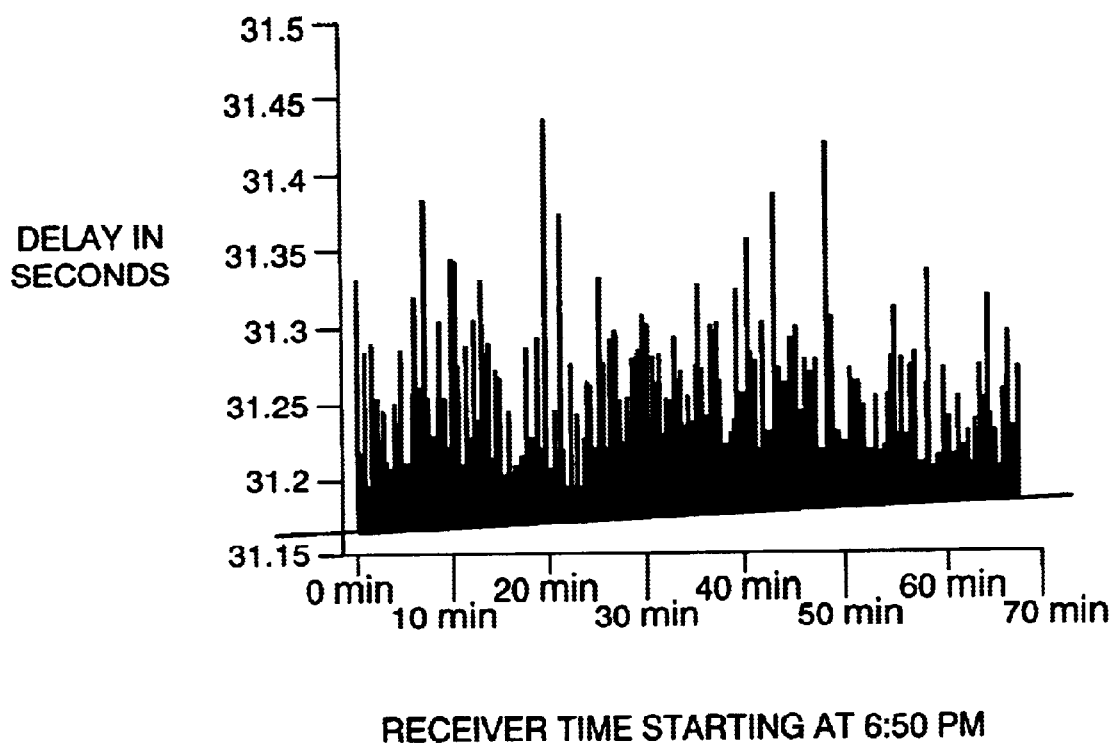
FIG. 5 depicts an actual set of end-to-end delay measurements.

An example of one-way delay measurements is depicted in schematic form in FIG. 4. A network engineer or other party measures the delay between a sender clock 150 and a receiver clock 160, by comparing the time stamps of the two clocks. Samples such as that depicted in FIG. 4 may be obtained from a series of measurements of the delay in seconds, measured on the y-axis, between a sender clock 150 and a receiver clock 160, as determined by comparing time stamps on data packets applied by each of the clocks 150, 160. The x-axis represents the sender clock's time stamp, measured in minutes. The y-axis is the delay calculated by subtracting the sender clock's time stamp from the receiver time stamp at each time represented by the sender time stamp. FIG. 4 is an illustrative example of characteristics of hypothetical measurements. FIG. 5 depicts actual measured delays for a network in one trace, in which the measured delay ranged from 31.15 to 31.5 seconds. It should be noted that the measured delay is not the actual end-to-end delay, but includes any clock offset between the two clocks 150, 160 plus the end-to-end delay in the network. Clock offset is the difference in time, and skew is the difference in clock speed.

Referring to FIG. 4, a typical delay shows a relatively constant trend over time. In the sample of FIG. 5, the delay increased about one hundred milliseconds over the duration of seventy minutes at the receiver. Such a delay is significant enough to distort performance metrics such as the percentile range, average, and perhaps auto-correlation, of end-to-end delay. While one might imagine that the ever-increasing minimum delay is due to increasing congestion and queuing delay, this is unlikely, as the minimum observed delay increases over time. Instead, the linear increase in minimum delay attests to a constant or nearly constant speed difference between two clocks. Similarly, a linear decrease in the minimum delay would reflect a nearly constant speed difference as well, but with the receiver clock being faster than the sender clock.

The end-to-end delay consists of transmission and propagation delays plus variable queuing delay. When all of the packets go through the same route to the receiver, they have the same propagation delay, and, if they have the same size, the transmission delay also is the same. Even if the packets go through the same route and have the same size, the packets experience different levels of queuing inside the network. These factors cause variability in the end-to-end delay. The variability is reflected by the wide range of data points in the traces of FIGS. 4 and 5. Despite the variability, meaningful information can be obtained by examining the minimum delays in the transmissions over time. Thus, the roughly linear trace 202 divides a region 204 in which no delay measurements occur and a region 208 in which at least some measurements occur. If the frequency difference between the sender clock and the receiver clock is constant, and at least some packets travel through the network with a minimum delay, then the trace 202 will be substantially linear, reflecting the increase or decrease of the absolute time difference between the clocks that results when their is a constant frequency difference. The slope of the trace 202 is the rate of change of the minimum delay; that is, the slope represents the frequency difference, or skew, between the clocks. It may be noted that if different routes are taken over a network, resulting in different routing delays, an improved estimate of clock skew may be obtained by separating data traces for the various routes.

Methods and systems are known which address problems in delay measurements by using forward and reverse path measurements of delay between a pair of hosts. The work of Paxson described above is an example of such an algorithm. Paxson uses both forward and reverse path measurements of delay between a pair of hosts to deal with clock synchronization problems, such as relative offset and skew. Many applications, such as unidirectional communications, see only one-way delay, and still have to deal with the clock synchronization problems in packet delay. One-way measurements alone are not enough to infer the clock offset, and one cannot distinguish the clock offset from the fixed portion of end-to-end delay. For example, in FIG. 5, it is difficult to tell how much of the 31.15 seconds of minimum delay is due to the time difference between clocks and the fixed transmission and propagation delay, without the availability of more information. Due to this lack of information in one-way delay, it is desirable to have a method and system that provides an estimate of clock skew through use of only one-way delay measurements.

Obtaining an accurate estimate of variable queuing delay serves a very important role in network and application design. Continuous-media applications such as audio and video need to absorb the delay jitter perceived at the receiver for smooth playout of the original stream. Determining the correct amount of buffering and reconstructing the original timing is crucial to the performance of continuous-media applications. The variable queuing delay is also useful in monitoring the network performance at the edges of the network; the transmission and propagation delay is fixed per route, and does not convey any information about the dynamic changes inside the network when packets follow a fixed route.

Methods and systems for estimating clock skew from one-way, end-to-end, network delay measurements are provided herein. FIG. 5 illustrates a trace where the skew between two clocks was nearly constant over the measurement duration. Looking at FIG. 5, one might be tempted to pick up a ruler, draw a line that skims through the bottom of the mass of the scatter-plot, measure the angle between the line and the x-axis, and calculate the skew using simple trigonometry. This approach is hard to automate and invites human errors that are untraceable. A second thought would be to pick the first and last data points, and draw a line between them. The accuracy of this approach, however, can be easily thrown off, since delay has formidable variability that is in the order of magnitude bigger than the skew all through the measurement duration. The present approach is to fit a line that lies under all the data points, but as closely to them as possible.

The approach may be formulated as a linear programming problem. The condition that the line should lie under all the data points forms the first part of the linear programming problem and defines the feasible region for a solution. The objective function of the linear programming problem is to minimize the sum of the vertical distances between the line and all the data points.

Figure 6A:
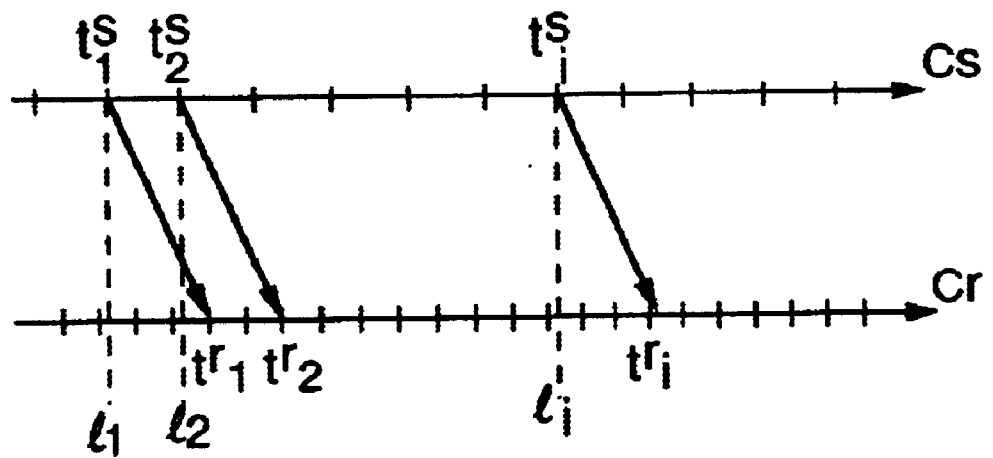
FIG. 6 depicts a timing chart showing variable delay of network transmissions.
Figure 6B:
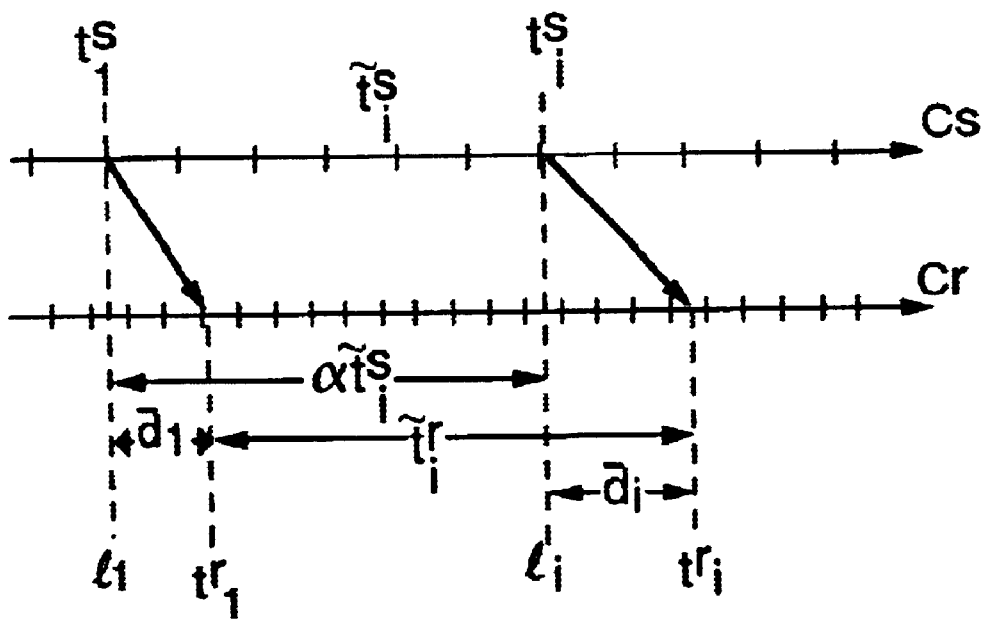

FIG. 6 illustrates timing charts showing cases of either a constant delay or a variable delay for a transmission between a sender system having a sender clock and a receiver system having a receiver clock.

Figure 7:
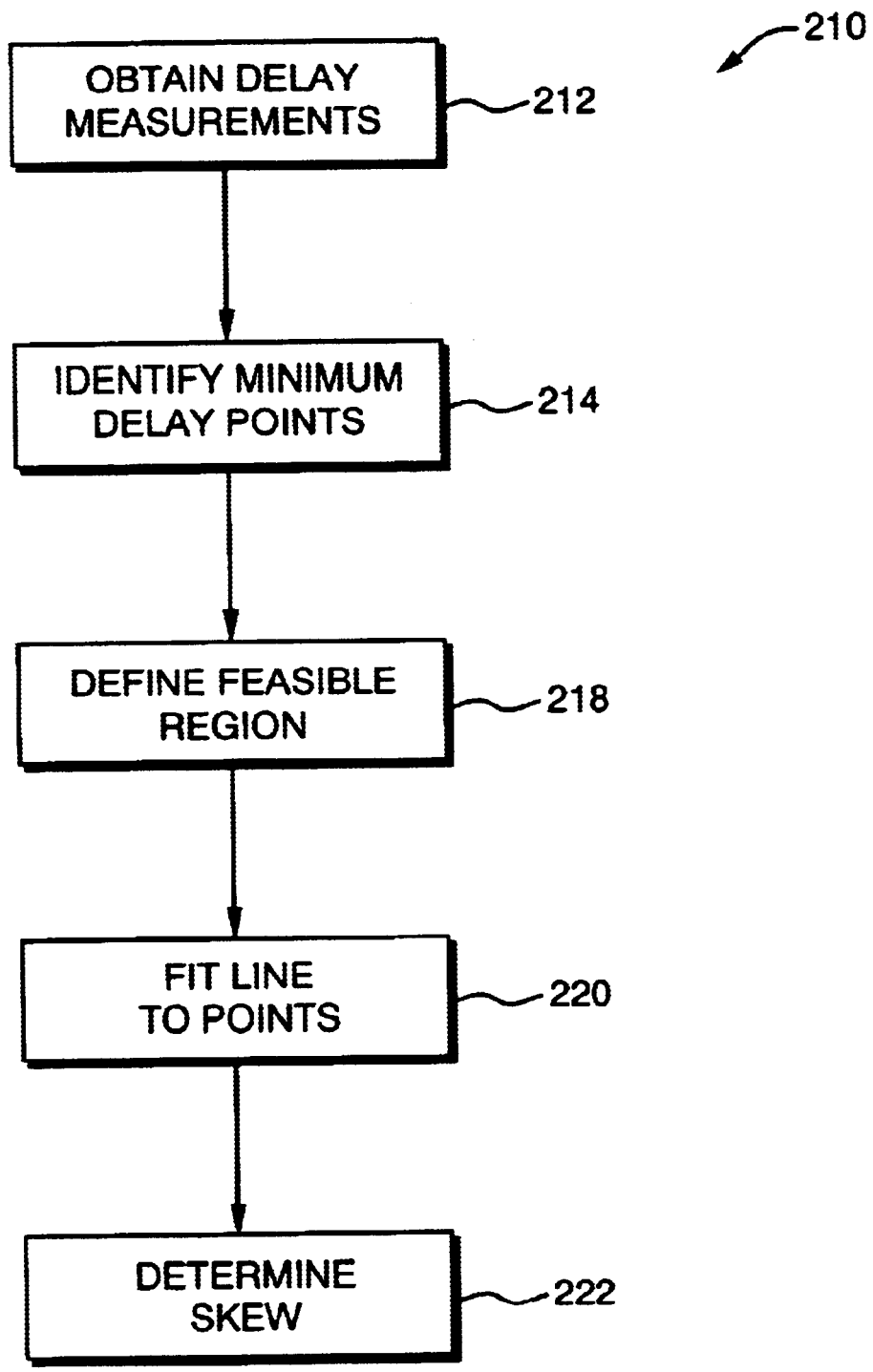
FIG. 7 depicts a flow chart illustrating steps of a linear programming method and system.

Steps for obtaining a skew estimate from one-way, end-to-end delay measurements in a linear programming approach are indicated in the flow chart 210 of FIG. 7. First, at a step 212, the user may obtain a measurement of the end-to-end delay for a plurality of data packet transmissions taking place over a plurality of time periods between a sender and a receiver to obtain a data set of delay measurements. As mentioned above, the data set may include the delay, as measured by the difference between the sender time stamp and the receiver time stamp on the data packet, as well as the time of transmission, as measured by the sender time stamp for the packet. A plot of all of the delays may be made, with delays appearing on the y-axis and the time of the transmission appearing on the x-axis of the plot.

Next, at a step 214, the user may determine a plurality of minimum delay data points consisting of the lowest delay for each of a plurality of time periods within the measurement sample. At a step 218, the user may then define a feasible region of solution as the set of points for each time period that is lower than the measured delay for each time period. At a step 220, the user may fit a line that is the closest line to the data points representing the minimum delay but that is within the feasible region of solution. The step 220 of fitting the line may be accomplished by minimizing the sum of the distances between the line and all the data points in the data set. Once the line has been fitted at the step 220, the slope of the line provides a reliable, estimate of clock skew in a step 222 that is believed to be unbiased.

The step 218 of defining a solution may be simplified by eliminating the requirement that certain constraints be examined. In particular, the definition of the feasible solution at the step 218 may be accomplished by recognizing that the minimum delay between a sender clock and a receiver clock (in cases of negative clock skew, or a decreasing minimum delay) must be smaller than the current minimum delay in order for it to be a relevant delay point in a set of data measurements. If the data point is greater than the current minimum, then the queuing delay may be inferred to be greater than the minimum, so the data point is discarded. Thus, certain possible regions of solution need not be examined, reducing the required processing time.

In greater detail, constraint reduction may be accomplished by first determining that the skew is either positive or negative. If the skew is determined to be positive, then data points may be examined in reverse order, with the data point for the last transmission examined first, the data point for the penultimate transmission examined second, and so on. If the skew is determined to be negative, then the data points may be examined in the order of the associated transmissions. In each case, constraint reduction calls for tracking the minimum delay that has been observed so far, or the cumulative minimum delay. If a data point is greater than the cumulative minimum delay, then it can be determined that the data point doesn't play into the solution, because the queuing delay for that data point is greater than the minimum delay. Thus, that data point can be discarded. Thus, given the sign of the clock skew, one knows whether to traverse a specified set of delay measurements in the forward or reverse direction when performing the constraint reduction step.

While it is frequently easy for a person to deduce the sign of the clock skew by observing the set of delay measurements, it may not be easy for a computer program to make the same type of deduction. In the case that the sign of the clock skew is unknown at the time the algorithm is run (because human intervention is not practical), one can force the sign of the clock skew for the purposes of the constraint reduction step by scaling either the sending or receiving timestamp by a constant close to one. The actual linear program is computed based on the undistorted values of the surviving delay measurements.

This technique is assured to work if the maximum skew between the sending and receiving clocks is known. For example, in the case of MPEG-2, the system clocks sent in the encoder (sender) and decoder (receiver) are constrained by the MPEG-2 standard to be within their nominal value by a specified tolerance. Therefore, the maximum allowable clock skew between the sender and receiver is given by twice that tolerance.

If the maximum clock skew is not known, it is still possible to guess conservatively. However, the larger the maximum clock skew is guessed to be, the more delay measurements will subsequently survive the constraint reduction step, thereby reducing the benefits of constraint reduction.

The step of fitting a line at the step 220 may also be simplified by simplifying the data set obtained at the step 212. In particular for a data set of transmissions of different packet sizes, it may be desirable to determine the mode packet size for the set of transmissions and use only measurements of transmissions of packets of the mode packet size in defining the feasible region at the step 218 and fitting the line at the step 220. This prevents obtaining a biased estimate that might result from unusual delay due to a particular packet size.

The step 212 may consist of measurements consisting of the time duration between a first packet's departure and each subsequent packet's departure consistent with the time measured by a sender clock. The step 212 may further include obtaining a calculated set of delay measurements consisting of the amounts determined by subtracting the time duration between the first packet's departure and each subsequent packet's departure as measured by the sender clock from the time duration between the first packet's arrival and each subsequent packet's arrival as measured by the receiver clock. In terms of the variables defined in Appendix A, the goal of the skew estimation algorithm is to estimate the clock ratio $\alpha$ given $\bar{t}_i^s$ and $\hat{d}_i$. The output of the skew estimation algorithm is: $\hat{\alpha}$ and $\hat{\beta}$, where $\bar{\alpha}$ is the estimate of $\alpha$, and $\hat{\beta}$ is the estimate of $\bar{d}_1$. If we estimate both $\alpha$ and $\bar{d}_1$ correctly, then we can subtract $(\alpha-1)\bar{t}_i^s - \bar{d}_1$, from $\hat{d}_i$ and obtain $\bar{d}_i$ which is the end-to-end delay consistent with C and free of clock skew. When we formulate our skew estimation as a linear programming problem, this condition defines the feasible region where a solution should lie.

Definition in the step 218 of a feasible region of solution for an estimate $\hat{\alpha}$ of the ratio between the speed of the sender clock and the speed of the receiver clock and for an estimate $\hat{\beta}$ of the end-to-end delay of the first packet consistent with the receiver clock, may be accomplished by defining the feasible region of solution according to the following condition:

$$\bar{d}_i - (\hat{\alpha} - 1)\bar{t}_i^s + \hat{\beta} \geq 0, \ 1 \leq i \leq N$$

where definitions of the various variable are as set forth in Appendix A.

The step of fitting a line at the step 220 may be accomplished by minimizing the vertical distance between the line and all delay measurements according to the following formula:

$$\min\left\{\sum_{i=1}^{N}\left(\bar{d}_i - (\hat{\alpha}-1)\bar{t}_i^N + \hat{\beta}\right)\right\}.$$

The minimizing condition is used to obtain the solution of the estimates of the ratio of the frequency between the two clocks and the end-to-end delay of the first transmission, consistent with the receiver clock. The estimated end-to-end delay of $\bar{d}_1$, calculated as $$\left(\bar{d}_i - (\hat{\alpha}-1)\bar{t}_i^N + \hat{\beta}\right)$$

once $\hat{\alpha}$ and $\hat{\beta}$ are obtained, will be greater than zero, instead of being greater than $\min_i \bar{d}_i$. Thus, $\hat{\beta}$ is actually an estimate of $(\bar{d}_1 + \min_i \bar{d}_i)$. The resulting delay of $\tilde{d}_i - (\hat{\alpha}-1)n\bar{t}_i^s + \hat{\beta}$ is not the end-to-end delay, but rather the variable portion of end-to-end delay.

One embodiment of the invention takes advantage of the fact that certain constraints imposed upon the fit of the line to the minimum delay data points are redundant; that is, data processing requirements may be reduced by eliminating the requirement that certain constraints be examined in processing. In this embodiment, the data point for the latest transmission in the series of data transmissions used to estimate delay is recognized as the minimum delay between the sender clock and the receiver clock.

When data is transmitted over a network, it is typically encoded into packets. Depending on the nature of the transmission, the packet size may vary; thus, for example, voice transmissions may have a different packet size from fax transmissions. Also, even within a certain type of transmission, packet size may vary. For example, in voice transmissions using G723 or G729 voice coding standards, packets representing silence or background noise may be of different length than packets representing speech. An embodiment of the invention takes note of the fact that different packet sizes for transmissions used in delay measurements may effect the size of the delay. Accordingly, it is desirable to select groups of packet sizes that represent the largest data set, in order to avoid variation in the delay estimation based on packet size. Thus, in one embodiment, data is selected by determining the mode packet size for a series of transmissions and using only measurements of transmissions of packets of that size in the determination of clock skew according to the present invention.

An efficient implementation of the algorithm exploits the fact that the time stamps of the sender packets are sorted. First, to figure out the feasible region constrained as described above, all the data points of the sender time stamps and delay measurements are tested for the feasible region from i=N to 1. Then we use the minimizing condition to determine estimates of $\hat{\alpha}$ and $\hat{\beta}$ within the feasible region. FIG. 8 depicts pseudo code of this implementation.

Properties satisfied by the algorithm are formally stated in Appendix A.

This implementation of a solution to the linear programming problem permits an efficient, robust estimation of clock skew with simple computational complexity. Accordingly, it may be useful for network engineers who need to obtain clock skew estimations in order to correct for clock skew in a wide variety of applications, including real-time audiovisual applications and other applications in which the relative timing of packets is critical, and in various network performance metrics that are used to improve or optimize other network applications.

While certain embodiments of the invention are depicted herein, it should be understood that other embodiments would be understood to one of ordinary skill in the art and that such embodiments are encompassed herein.

Appendix A

In this section we introduce the terminology we use to describe clock behavior. Let us begin by defining a clock. It is a piecewise continuous function that is twice differentiable except on a finite set of points:

$$C : R \rightarrow R$$

where $C'(t) \equiv dC(t)/dt$ and $C''(t) \equiv d^2C(t)/dt^2$ exist everywhere except for $t \in P \subset$ where $|P|$ is finite.

A "true" clock reports "true" time at any moment, and runs at a constant rate. Let $C_t$ denote the "true" clock; it is the identity function given below, $$C_t(t) = t \text{ and } P_t = \emptyset$$

In the paper, we use the following nomenclature from [Mil92a, Mil92b] to describe clock characteristics. Let $C_a$ and $C_b$ be two clocks:

offset: the difference between the time reported by a clock and the "true" time; the offset of $C_a$ is $(C_a(t)-t)$. The offset of the clock $C_a$ relative to $C_b$ at time $t \geq 0$ is $C_a(t) - C_b(t)$.

frequency: the rate at which the clock progresses. The frequency at time $t$ of $C_a$ is $C_a'(t)$.

skew: the difference in the frequencies of a clock and the "true" clock. The skew of $C_a$ relative to $C_b$ at time $t$ is $C_a'(t) - C_b'(t)$.

drift: The drift of clock $C_a$ is $C_a''(t)$. The drift of $C_a$ relative to $C_b$ at time $t \geq 0$ is $-C_a''(t) - C_b''(t)$.

Two clocks are said to be synchronized at a particular moment if both the relative offset and skew are zero. When it is clear that we refer to clocks that are not the "true" clock in our discussion, we simply refer to relative offset and relative skew as offset and skew, respectively.

It is sometimes convenient to compare the frequency ratio between two clocks instead of the skew. This is captured by the following definition.

clock ratio: the frequency ratio between a clock and the "true" clock; the ratio of $C_a$ is $C'(a)$. The ratio of $C_a$ relative to $C_b$ at time $t$ is $C_a'(t)/C_b'(t)$.

Let $C_a$ and $C_b$ have constant frequencies, and $\alpha$ and $\delta$ be the clock ratio and skew of $C_b$ relative to $C_a$, respectively. $\alpha = C_b'/C_a'$ and $\delta = C_b' - C_a'$. Then the relation between the clock ratio and the skew is:

$$\delta = C_b' - C_a' = \alpha C_a' - C_a' = (\alpha - 1)C_a' \qquad (1)$$

From now on, we assume that the sender and receiver clocks have constant frequencies, and thus their skew and clock ratio are constant over time; we use them interchangeably, and use (1) whenever necessary to convert one from the other.

3.2 Time Duration Consistent With a Clock

In the previous section, we have defined a clock and terms relevant to its behavior. In this section we look at how a time duration is measured according to a clock. Let $\Delta(t_1, t_2, C_a)$ denote the time that has passed according to $C_a$ between $t_1$ and $t_2$ of the "true" clock. Since a clock is a piecewise continuous function, we define the time duration as:

$$\Delta(t_1, t_2, C_a) = \int_{t_1}^{t_2} C'_a dt$$

$$= \int_{t_1}^{p_1} C'_a dt + \int_{p_1}^{p_2} C'_a dt + \ldots + \int_{p_{n-1}}^{p_n} C'_a dt + \int_{p_n}^{t_2} C'_a dt$$

where $P_a \cap (t_1, t_2) = \{p_1, p_2, \ldots, p_n\}$ and $t_1 < p_1 < p_2 < \ldots < p_n < t_2$, $1 \leq i \leq n$ If $P_a \cap (t_1, t_2) = \emptyset$, then $$\Delta(t_1, t_2, C_a) = \int_{t_1}^{t_2} C'_a dt = C_a(t_2) - C_a(t_1) \qquad (2)$$

When two clocks are not synchronized and, more specifically, have different frequencies, time duration measured with one clock will be different from the other. We say that a time duration measured with a clock is consistent with any other clock of the same frequency and any offset. If two clocks have a non-zero skew, time measured on one clock will not be consistent with the other clock.

We have modeled a clock as a piecewise continuous function in order to take into account the restrictions of real clocks. The resolution of a clock on a computer system is the smallest unit by which the clock's time is updated, and is greater than zero. At best, a clock in a computer is a step function with increments at every unit of its time resolution. We consider the time reports by a real clock with a fixed minimum resolution as samples of a continuous function at specific moments, and thus circumvent the discretization effect of the real clock. Another problem a real clock poses is the abrupt time adjustment possible through a time resetting system call. Some systems that do not run NTP [Mil92b] have a very coarse-grain (in the order of hours) synchronization mechanism in the cron table. The time adjustment in such a case can be several orders of magnitude larger than the usual increment of the clock resolution, and the time can even be set backward. The piecewise nature of a clock function accommodates the abrupt time adjustment.

When a delay measurement involves more than one clock, the synchronization between those clocks has a tremendous impact on the accuracy of the measurement. Let us consider a case of measuring a packet delay between two hosts. The sender adds a timestamp to a packet when it leaves the sender, and the receiver records the time the packet arrives at the receiver. When the two host clocks are perfectly synchronized, the difference between the two timestamps is the end-to-end network delay experience by that packet. If the clocks on the two hosts have a non-zero offset, but no skew, the difference between two timestamps includes not only the end-to-end delay, but also the offset. Given only a one-way measurement, we cannot distinguish the offset from the measurement, unless we are given the network delay, which is what we intended to measure in the first place. If the clocks have a non-zero skew, not only is the end-to-end delay measurement off by an amount equal to the offset, but it also gradually increases or decreases over time depending on whether the sender clock runs slower or faster than the receiver clock.

In the following sections we formalize the clock synchronization problem outlined above, and show how to remove the clock skew in measurements.

4 Basics of a Skew Estimation Algorithm

In the previous section we have defined a clock, and what is meant for a delay to be consistent with a clock. In this section we discuss the estimation and removal of the effects of clock skew in delay measurements. We first derive how much the clock skew contributes to the measured end-to-end delay if the skew is non-zero and constant. This derivation provides a basis for the discussion of several desirable properties for skew estimation algorithms.

4.1 Delay Measured Between Two Clocks

From Section 4.1, if the clock ratio between the sender and receiver clocks is greater than or less than 1, network delays will appear to become longer or shorter over the course of a measurement period. The purpose of removing this effect of skew on the delay measurements is to transform the delay measurements so that they are consistent with a single clock. In our work, we have chosen to make the delay measurements consistent with the receiver clock. When there is no provision at the receiver to the "true" clock, the only clock the receiver has access to is its own clock. It is thus natural to measure one-way delay according to the receiver clock. Without loss of generality, we fix the receiver clock to be the "true clock", i.e. $C_r'(t)=1$ and $a=C_s'(t)$, and derive the notations below as such.

For packets of different sizes, the clock skew may not be distinguishable from the delay trend, if any. For example, if the packet size grows over time and the route from the sender to the receiver is fixed, then the transmission delay gradually increases, and it is hard to distinguish a skew from this delay trend. Thus we assume all the packets have the same size in the following sections.

Let us now introduce the terminology for clocks, timestamps, and delays used in measurements.

$C_s$: sender clock.

$C_r$: receiver clock.

N: number of packets that arrive at the receiver.

$l_i$: timestamp of the i-th packet leaving the sender according to $C_r$, i=1,2, . . . ,N.

$t^s_i$: timestamp of the i-th packet leaving the sender according to $C_s$, i=1,2, . . . ,N; $t^s_i = C_s(l_i)$.

$t^r_i$: timestamp of the i-th packet arriving at the receiver according to $C_r$, i=1,2, . . . ,N.

$d_i$: end-to-end delay measurement of the i-th packet, i=1,2, . . . ,N;

$$d_i = t^r_i - t^s_i \qquad (3)$$

FIG. 2: Timing chart showing constant delay—See FIG. 6 of application

FIG. 2 shows the timing between $C_s$ and $C_r$ when $C_s$ runs half the speed of $C_r$ and all the packets experience the same network delay. The end-to-end delay of the i-the packet consistent with $C_r$ is $t^r_i - l_i$. $l_i$, however, is not known at the receiver, and we calculate $d_i$ using $t^s_i$ and $t^r_i$. As a result, in this case, the end-to-end delay is consistent with neither $C_s$ nor $C_r$. To make it consistent with $C_r$, we need to determine the skew of $C_r$ relative to $C_s$, and remove it from the measurement $d_i$.

4.2 Clock Skew in Delay Measurements

When there is a constant clock skew between two clocks, the clock offset between them gradually increases or decreases over time, depending on the sign of the skew. The amount of increase or decrease in the clock offset is proportional to the time duration of observation. The longer you observe, the larger the offset is. We use this amount of offset change to estimate the clock skew. Thus it is more convenient to use timestamps relative to a specific point in time, such as the departure and arrival times of the first packet, than absolute timestamps. Below we introduce relative timestamps at the sender and the receiver.

$\bar{t}^s_i$: time duration between the first and the i-th packets' departures at the sender consistent with $C_s$.

$$\bar{t}^s_1 = 0$$

$$\bar{t}^s_i = \Delta(l_1, l_i, C_s) = t^s_i - t^s_1$$

$\bar{t}^r_i$: time duration between the first and the i-th packets' arrivals at the receiver consistent with $C_r$.

$$\bar{t}^r_1 = 0$$

$$\bar{t}^r_i = t^r_i - t^r_1$$

FIG. 3: Timing chart showing variable delay—See FIG. 6 of specification By (1) and (2).

$$\Delta(l_1, l_i, C_r) = l_i - l_1 \qquad (4)$$
$$= \alpha \Delta(l_1, l_i, C_s) = \alpha \bar{t}^s_i$$

FIG. 3 illustrates the relationship between $\Delta(l_1, l_i, C_r)$ and $\bar{t}^s_i$ on a timing chart. The quantities $\bar{d}_1$ and $\bar{d}_i$ shown in the figure are defined as below.

$\bar{d}_i$: end-to-end delay consistent with $C_r$.

$$\bar{d}_1 = \Delta(l_1, t^r_1, C_r) = t^r_1 - l_1 \qquad (5)$$
$$\bar{d}_i = \Delta(l_i, t^r_i, C_r) = t^r_i - l_i$$
$$= t^r_i - l_1 - \alpha \bar{t}^s_i = (t^r_i - t^r_1) + (t^r_1 - l_1) - \alpha \bar{t}^s_i$$
$$= \bar{t}^r_i + \bar{d}_1 - \alpha \bar{t}^s_i$$

The quantity $\bar{d}_1$, however, is not obtainable directly from measured timestamps, due to the skew between the sender and receiver clocks. The quantity that is obtainable from actual timestamps is the following.

$\bar{d}_i$: delay calculated from $\bar{t}^s_i$ and $\bar{t}^r_i$.

$$\bar{d}_i = \bar{t}^r_i - \bar{t}^s_i = \bar{t}^r_i + \bar{d}_1 - \alpha \bar{t}^s_i + (\alpha - 1)\bar{t}^s_i - \bar{d}_1 \quad \bar{d}^r_i \qquad (6)$$
$$= \bar{d}_i + (\alpha - 1)\bar{t}^s_i - \bar{d}_1$$

The goal of estimating and removing the clock skew is to obtain $\bar{d}_i$ from the actual delay measurement, $\bar{d}_i$. From (3) and (6), we note that the difference between $d_i$ and $\bar{d}_i$ is:

$$d_i - \bar{d}_i = t^r_1 - t^s_1.$$

Also note in (6) that $\bar{d}_i$ is different from $\bar{d}_i$ by $(\alpha-1)\bar{t}^s_i$ minus a constant $\bar{d}_1$. If $\alpha > 1$, $(\alpha-1)\bar{t}^s_i$ grows linearly with $\bar{t}^s_i$, and thus $\bar{d}_i$ gets larger. This is what contributed to an increasing trend we observed in FIG. 1. Finally, from (6), it is obvious that the measured network delays can be made consistent with $C_r$ given $\alpha$ and $\bar{d}_i$ according to:

$$\bar{d}_i = \bar{d}_i - (\alpha - 1)\bar{t}^s_i + \bar{d}_1. \qquad (7)$$

Let $\hat{\alpha}$ and $\hat{\beta}$ be the estimates for $\alpha$ and $\bar{d}_1$. Then the delay after the skew removal, $\hat{d}_i$, is:

$$\hat{d}_i = \bar{d}_i - (\hat{\alpha} - 1)\bar{t}^s_i + \hat{\beta} \qquad (8)$$

Before we delve into details of the skew estimation algorithm, we first state the desirable properties that any such algorithm should exhibit We use these properties later as a basis of comparing different estimation algorithms.

To formally state the properties, we hereby introduce the notations for an estimation algorithm and estimates parameterized by the estimation algorithm. Let $\lambda$ be a skew estimation algorithm. We make the same assumption as in Section 4.1 that the skew between the sender and the receiver clocks is constant, and the receiver clock is "true" clock. Given a set of end-to-end delays, D which = $\{\tilde{d}_i\}^N_{i=1}$, which are predetermined and fixed, and also consistent with the "true" clock, we know that ft delay measurements, $\tilde{d}_i$'s, are equal to $\tilde{d}_i$, if there is no clock skew between the two hosts (a=0); $\tilde{d}_i$'s are different from $\tilde{d}_i$, if the clock skew is not zero (a$\geq$0). In that sense $\tilde{d}_i$ is dependent on the clock skew, $\alpha$ and $\tilde{d}_i$, and is noted $\tilde{d}_i(\alpha, D)$.

We define $\hat{\alpha}_A(\alpha, D)$ and $\hat{\beta}_A(\alpha, D)$ as the estimates of $\alpha$ and $\bar{d}_1$, respectively, delivered by algorithm A, when given i,-, $1 \leq i \leq N$ and $\alpha$. Below is a list of desirable properties that should be exhibited by algorithm A.

Property 1: The time and space complexity of algorithm A should be linear in N. The computational complexity of an algorithm in terms of time and space is an important metric in assessing the performance and applicability of the algorithm. We will compare the time complexity of skew estimation algorithms as a function of the number of delay measurements.

Property 2: Since the purpose of the skew estimation is to remove the skew from delay measurements, it is desirable that the delays be non-negative after the skew is removed.

$$\hat{d}_i = \tilde{d}_i(\alpha, D) - (\hat{\alpha}_A(\alpha, D) - 1)\bar{t}^s_i + \hat{\beta}_A(\alpha, D) \geq 0$$

Property 3: The skew estimation algorithm should be robust in the sense that it is not affected by the magnitude of the actual skew. That is, the difference between the estimate and the actual skew should be independent of the actual skew. Under the same network condition, the skew estimate for different skews should exhibit the same margin of error from the actual skew, no matter how small or large the skew is. We state this property as follows:

$$\hat{\alpha}_A(\alpha, D) - \alpha = \hat{\alpha}_A) 1, D) - 1$$

for any a>0.

In the following section, we introduce a new algorithm based on linear programming to estimate a in delay measurements, and use the result to remove the skew from one-way delay measurements to make them consistent with the receiver clock. In the next two sections, we focus on a simple case where the clock skew is constant, and defer the discussion of a time-varying skew to Section 8.

5 Linear Programming Algorithm

FIG. I illustrates a trace where the skew between two clocks was nearly constant over the measurement duration. Looking at the figure, one is tempted to pick up a ruler, draw a line that skims through the bottom of the mass of the scatter-plot, measure the angle between the line and the x-axis, and calculate the skew using simple trigonometry. This approach is hard to automate, and invites human errors that are untraceable. A second thought would be to pick the first and last data points, and draw a line between them. The accuracy of this approach, however, can be easily thrown off, since delay has formidable variability that is in the order of magnitude bigger than the skew all through the measurement duration. Our approach is to fit a line that lies under all the data points, but as closely to them as possible.

We have formulated the above idea as a linear programming problem. The condition that the line should lie under all the data points forms the first part of our linear programming problem, and defines the feasible region for a solution; the objective function of the linear programming problem is to minimize the sum of the distances between the line and all the data points on the y-axis.

5.1 Algorithm

Having presented our intuition behind the algorithm, we now introduce the algorithm formally. The goal of the skew estimation algorithm is to estimate the clock ratio $\alpha$ given $\bar{t}^s_{,i}$ and $\bar{d}_1$. The output of the skew estimation algorithm is: $\hat{\alpha}$ and $\hat{\beta}$, where $\hat{\alpha}$ is the estimate of $\alpha$, and $\hat{\beta}$ is the estimate of $\bar{d}_1$. We return to the interpretation of $\hat{\beta}$ the end of this section. If we estimate both $\alpha$ and $\bar{d}_1$ correctly, then we can subtract $(\alpha-1)\bar{t}^s_i - \bar{d}_1$ from $\bar{d}_i$, and obtain $\bar{d}_1$, which is the end-to-end delay consistent with $C_r$ and free of clock skew. Even when the estimates $\hat{\alpha}$ and $\hat{\beta}$ are not exactly the same as $\alpha$ and $\bar{d}_1$, we still want the resulting end-to-end delay to be non-negative, after the skew is removed. When we formulate our skew estimation as a linear programming problem, this condition defines the feasible region where a solution should lie.

$$\tilde{d}_i - (\hat{\alpha}-1)\bar{t}^s_i + \hat{\beta} \geq 0, 1 \leq i \leq N$$

There are infinitely many pairs of $\hat{\alpha}$ and $\hat{\beta}$ that satisfy the condition above, if the feasible region from (10) is not trivial. Our objective function to minimize the distance between the line and all the delay measurements is stated as:

$$\min\left\{\sum_{i=1}^{N}(\tilde{d}_i - (\hat{\alpha}-1)t^s_i + \beta)\right\}$$

and is used to determine the solution to $\hat{\alpha}$ and $\hat{\beta}$ from (10).

One important point to note in (10) is that the estimated end-to-end delay of $\tilde{d}_i$, calculated as $(\tilde{d}_i - (\hat{\alpha}-1)\bar{t}^s_i + \hat{\beta}$ once $\hat{\alpha}$ and $\hat{\beta}$ are obtained, will be greater than zero, instead of being greater than $\min_i \tilde{d}_i$. Thus $\hat{\beta}$ is actually an estimate of ($\bar{d}_1 + \min_i \tilde{d}_i$). The resulting delay of $\tilde{d}_i - (\hat{\alpha}-1)\bar{t}^s_i + \hat{\beta}$ is not the end-to-end delay, but rather the variable portion of the end-to-end delay.

In the following sections, we look into other algorithms that can be used in skew estimation, and compare them with our linear programming algorithm in terms of the properties listed in Section 4, and their performance in actual and synthetic measurements.

7.1 Computational Complexity

The time complexity of a linear programming problem of a finite dimension of two is proven to be O(N). We have implemented a simple and efficient algorithm that exploits the fact $\bar{t}^s_i$'s are sorted in our specific problem. Refer to Appendix A for its pseudo code. Paxson's algorithm has O(N log N) complexity. Going back to the algorithm in Section 6.1, all the other steps have O(N) or smaller complexity except for Step 2. The number of slopes of all possible pairs of the "de-noised" OTTs is O(N), and finding a median of O(N) numbers is O(N log N). The time complexity of the linear regression and piecewise minimum algorithms is O(N).

7.2 Non-negative Delay After the Skew Removal

In order to guarantee that the delay remains positive after the skew is removed, a skew estimation algorithm must estimate $\bar{d}_1$ correctly. The linear programming algorithm, however, is the only one that estimates $\bar{d}_1$ (or $\bar{d}_1+\min_i\bar{d}_i$), as explained in Section 5. Paxson's original algorithm for skew estimation is for two-way measurements after the clock offset has been removed. The linear regression algorithm provides an estimate of $\hat{\beta}$. However this is just a y-intercept of the regression line which bears no relevance to the correct estimation of $\bar{d}_1$. The piecewise minimum algorithm outputs a concatenation of line segments, and the slopes of those line segments are skew estimates. The algorithm does not have any provision to guarantee that all the data points lie above the concatenation of line segments.

For the three algorithms that do not provide an estimate for $\bar{d}_1$, that ensures that delays are non-negative after the skew removal, we choose a $\hat{\beta}$ that satisfies the following condition for all $\hat{\alpha}$'s in each algorithm:

$$\max_{1 \leq i \leq N}\{\beta: \tilde{d}_i - (\hat{\alpha}_i - 1)\bar{t}^s_i + \beta_i > 0\}$$

where $\hat{\alpha}_i = \hat{\alpha}$ and $\hat{\beta}_i = \hat{\beta}$ for $1 \leq i \leq N$ in Paxson's and linear regression algorithms; in the piecewise minimum algorithm $\hat{\alpha}_i$ and $\hat{\beta}_i$ are determined by the line segment to which $\bar{d}_1$ and $\bar{t}^s_i$ belong to.

7.3 Robustness

We will next demonstrate another property of the linear programming algorithm that distinguishes it from the other three algorithms: its performance, as measured by the difference between the estimate and the actual skew, depends only on the variability of the network delays, and not on the magnitude of the clock skew. It guarantees that the estimation algorithm performs reliably, in the sense that the margin of error remains the same, no matter how large the skew is.

We first show that the linear programming algorithm satisfies this property, and follow it with a discussion about other algorithm.

7.3.1 Linear Programming Algorithm

We use the same assumptions and notations for the skew estimation algorithm and estimates as in Section 4.3 when considering two different clock skews: a set of delays, D={$\bar{d}_1\}_{i=1}^N$ where $\bar{d}_1$'s are fixed, and the clock ratio varies from one to some constant. It can be restated as follows. From one set of measurements to the other, nothing changes except for the frequency of the sender clock relative to the receiver clock. The receiver observes that the delay measurements, $\bar{d}_1$'s, are different between two sets, but the end-to-end delays consistent with the receiver clock remain the same in both sets. We also note that $\bar{t}^s_i$'s remain the same in both sets.

Consider the sender and receiver clocks are "true" clocks, and a set of packet delays, D={$\bar{d}_1\}_{i=1}^N$ is consistent with the "true clock." Suppose that we measure those delays when the frequence of the sender clock changes so that the skew is $\alpha=1$. We have $$\tilde{d}_{i(1,D)} = \tilde{d}_i - \tilde{d}_1$$

$$\tilde{d}_i(\alpha_i, D) = \tilde{d}_i + (\alpha - 1)\bar{t}^s_i - \tilde{d}_1$$

from (6).

Let A be the linear programming algorithm, and consider the problem of determining $\hat{\alpha}$ and $\hat{\beta}$ when both clocks are "true-clocks. By (10), (11), and (14), the problem becomes minimizing $$\left\{\sum_{i=1}^{N}\{\tilde{d}_i - \tilde{d}_1 - (\hat{\alpha}-1)\bar{r}_i^s + \hat{\beta}\}\right\}$$

such that $$\hat{\beta} \geq (\hat{\alpha}-1)\bar{r}_i^s - \tilde{d}_i + \tilde{d}_1, \text{ for } 1 \leq i \leq N$$

Let $\hat{\alpha}_A(1, D)$ and $\hat{\beta}_A(1, D)$ be the values that solve this problem.

Now define $\alpha^* = (\alpha + \hat{\alpha}_A(1, D) - 1)$, and substitute $\alpha^* - \alpha$ with $\hat{\alpha}_A(1, D) - 1$ above, and the above problem is now equivalent to choosing $\alpha^*$ and $\hat{\beta}$ that minimize $$\left\{\sum_{i=1}^{N}\{\tilde{d}_i - \tilde{d}_1 - (\alpha^* - \alpha)\bar{r}_i^s - \hat{\beta}\}\right\}$$

such that $$\hat{\beta}(\alpha^* - \alpha)\bar{r}_i^s - \tilde{d}_i + \tilde{d}_1, \text{ for } 1 \leq i \leq N$$

By (15), it is equivalent to choosing $\alpha^*$ and $\hat{\beta}$ to minimize $$\sum_{i=1}^{N}\{\tilde{d}_i(\alpha, D) - (\alpha^* - 1)\{\bar{r}_i^s + \hat{\beta}\}$$

such that $$\hat{\beta} \geq (\alpha^* - 1)\bar{r}_i^s, -\tilde{d}_i(\alpha, D), \text{ for } 1 \leq i \leq N,$$

which solves the case when the skew is $\alpha = 1$. Let $\hat{\alpha}_A(\alpha, D)$ and $\hat{\beta}_A(\alpha, D)$ be the values that solve the above problem. Then we can conclude:

$$\hat{\alpha}_A(\alpha,D) - \alpha = \hat{\alpha}_A(1,D) - 1 \text{ and } \hat{\beta}_A(\alpha,D) = \hat{\beta}_A(1,D).$$

What is claimed is:

1. A method of estimating the skew between a sender clock and a receiver clock on a network, comprising:
   for a set of packets sent over a network, obtaining a set of measurements consisting of the time duration between a first packet's departure and each subsequent packet's departure consistent with the time measured by a sender clock;
   obtaining a calculated set of delay measurements consisting of the amounts determined by subtracting the time duration between the first packet's departure and each subsequent packet's departure as measured by the sender clock from the time duration between the first packet's arrival and each subsequent packet's arrival as measured by the receiver clock;
   defining a feasible region of solution for an estimate $\hat{\alpha}$ of the ratio between the speed of the sender clock and the speed of the receiver clock and for an estimate $\hat{\beta}$ of the end-to-end delay of the first packet consistent with the receiver clock, wherein the feasible region is defined by the following condition:

$$\frac{N}{d_i} - (\hat{\alpha}-1)\frac{N}{t_i^s} + \hat{\beta} \geq 0, 1 \leq i \leq N$$

and minimizing the vertical distance between the line and all delay measurements according to the formula $$\min\left\{\sum_{i=1}^{N}\left(\tilde{d}_i - (\hat{\alpha}-1)\frac{N}{t_i^s} + \hat{\beta}\right)\right\}$$

2. A method of claim 1, further comprising:
   eliminating the requirement that certain constraints be examined in processing by using the data point for the cumulative minimum delay as the minimum delay between the sender clock and the receiver clock for a subsequent packet.

3. A method of claim 1, further comprising:
   for a data set of transmissions of different packet sizes, determining the mode packet size for the set of transmissions and using only measurements of transmissions of packets of the mode packet size in defining the feasible region and minimizing the distance between the line and the delay measurements.

4. A method of estimating clock skew from network delay measurements, comprising:
   measuring the end-to-end delay for a plurality of transmissions over a plurality of time periods between a sender and a receiver to obtain a plurality of minimum delay data points;
   defining a feasible region of solution as the set of points for each time period that is lower than the measured delay for each time period; and
   fitting a line that is the closest line to the data points representing the minimum delay but that is within the feasible region of solution.

5. A method of claim 4, wherein fitting the line comprises minimizing the sum of the distances between the line and the minimum delay data points.

6. A method of claim 4, further comprising:
   selecting a data set consisting of packets of a mode packet size.

7. A method of claim 4, further comprising:
   using the data point for the cumulative minimum delay as the minimum delay between the sender clock and the receiver clock for a subsequent packet.

8. A method of claim 4, further comprising:
   correcting a measurement to account for clock skew.

9. A method of estimating clock skew from network delay measurements, comprising:
   measuring the end-to-end delay for a plurality of data packet transmissions over a plurality of time periods between a sender and a receiver to obtain a data set;
   determining a plurality of minimum delay data points consisting of the lowest delay for each of the plurality of time periods;
   defining a feasible region of solution as the set of points for each time period that is lower than the measured delay for each time period;
   fitting a line that is the closest line to the data points representing the minimum delay but that is within the feasible region of solution, wherein fitting the line comprises minimizing the sum of the distances between the line and all the data points in the data set;
   eliminating the requirement that certain constraints be examined in processing by using the data point for the immediately prior packet as the minimum delay between the sender clock and the receiver clock for a subsequent packet; and
   for a data set of transmissions of different packet sizes, determining the mode packet size for the set of transmissions and using only measurements of transmissions of packets of the mode packet size in defining the feasible region and minimizing the distance between the line and the delay measurements.

10. A system for correcting clock skew, comprising:
a network for sending data packets between a sender device and a receiver device, the sender device having a sender clock and the receiver device having a receiver clock,
a processor for processing measurements consisting of the time duration between a first packet's departure and each subsequent packet's departure consistent with the time measured by the sender clock and for obtaining a calculated set of delay measurements consisting of the amounts determined by subtracting the time duration between the first packet's departure and each subsequent packet's departure as measured by the sender clock from the time duration between the first packet's arrival and each subsequent packet's arrival as measured by the receiver clock, wherein the processor defines a feasible region of solution for an estimate $\hat{\alpha}$ of the ratio between the speed of the sender clock and the speed of the receiver clock and for an estimate $\hat{\beta}$ of the end-to-end delay of the first packet consistent with the receiver clock, wherein the feasible region is defined by the following condition:

$$\tilde{d}_i - (\hat{\alpha} - 1)\tilde{t}_i^s + \hat{\beta} \geq 0, \ 1 \leq i \leq N$$

and wherein the processor minimizes the distance between the line and all delay measurements according to the formula $$\min\left\{\sum_{i=1}^{N}\left(\tilde{d}_i - (\hat{\alpha} - 1)\frac{N}{t_i^s} + \hat{\beta}\right)\right\}$$

11. A system of claim 10, wherein the processor eliminates the requirement that certain constraints be examined in processing by using the data point for cumulative minimum delay as the minimum delay between the sender clock and the receiver clock for a subsequent packet.

12. A system of claim 10, wherein the processor, for a data set of transmissions of different packet sizes, determines the mode packet size for the set of transmissions and uses only measurements of transmissions of packets of the mode packet size in defining the feasible region and minimizing the distance between the line and the delay measurements.

13. A system for correcting clock skew, comprising:
means for transmitting data packets between a sender device and a receiver device, the sender device having a sender clock and the receiver device having a receiver clock;
means for processing measurements consisting of the time duration between a first packet's departure and each subsequent packet's departure consistent with the time measured by the sender clock and for obtaining a calculated set of delay measurements of the time duration between departure of each packet from the sender device and arrival of the packet at the receiver device;
means for defining a feasible region of solution as the set of points for each time duration that is lower than the measured delay for each time duration; and
means for fitting a line that is the closest line to the data points representing the minimum delay but that is that is within the feasible region of solution.

14. A method of providing timing recovery of video transmissions, comprising:
estimating the skew between a sender clock and a receiver clock on a network, the step of estimating the skew comprising
for a set of packets sent over a network, obtaining a set of measurements consisting of the time duration between a first packet's departure and each subsequent packet's departure consistent with the time measured by a sender clock;
obtaining a calculated set of delay measurements consisting of the amounts determined by subtracting the time duration between the first packet's departure and each subsequent packet's departure as measured by the sender clock from the time duration between the first packet's arrival and each subsequent packet's arrival as measured by the receiver clock;
defining a feasible region of solution for an estimate $\hat{\alpha}$ of the ratio between the speed of the sender clock and the speed of the receiver clock and for an estimate $\hat{\beta}$ of the end-to-end delay of the first packet consistent with the receiver clock, wherein the feasible region is defined by the following condition:

$$\frac{N}{d_i} - (\hat{\alpha} - 1)\frac{N}{t_i^s} + \hat{\beta} \geq 0, \ 1 \leq i \leq N$$

and minimizing the vertical distance between the line and all delay measurements according to the formula $$\min\left\{\sum_{i=1}^{N}\left(\tilde{d}_i - (\hat{\alpha} - 1)\tilde{t}_i^s + \hat{\beta}\right)\right\};$$

and adjusting the timing of a packet of video data to reflect the estimated skew.

15. A method of claim 14, wherein the video data is MPEG-2 video data.

16. A method of providing a multi-user application, comprising:
providing a host system with an application environment;
providing a plurality of user systems connected to the host system via a communication link;
estimating clock skew among the host system and the user systems from network delay measurements, wherein the step of estimating clock skew comprises
measuring the end-to-end delay for a plurality of transmissions over a plurality of time periods between a sender and a receiver to obtain a plurality of minimum delay data points; and
fitting a line that is the closest line to the data points representing the minimum delay but that is less than the minimum delay for each transmission period; and
adjusting the timing of the application to account for the estimated clock skew.

17. A method of claim 16, wherein fitting a line comprises:
defining a feasible region of solution for an estimate $\hat{\alpha}$ of the ratio between the speed of the sender clock and the speed of the receiver clock and for an estimate $\hat{\beta}$ of the end-to-end delay of the first packet consistent with the receiver clock, wherein the feasible region is defined by the following condition:

$$\frac{N}{d_i} - (\hat{\alpha} - 1)\frac{N}{t_i^s} + \hat{\beta} \geq 0, 1 \leq i \leq N$$

and minimizing the vertical distance between the line and all delay measurements according to the formula $$\min\left\{\sum_{i=1}^{N}\left(\tilde{d}_i - (\hat{\alpha} - 1)\tilde{t}_i^s + \hat{\beta}\right)\right\}.$$

18. A method of claim 16, wherein the application is a computer game.

19. A method of claim 16, wherein the application is a virtual reality application.

20. A method of claim 16, wherein the application is a real-time simulation.

21. A method of claim 16, wherein the application is a combat simulation.

22. A method of claim 16, wherein the application is a flight simulation.

23. A method of claim 16, wherein the application is a driving simulation.

24. A method of claim 16, wherein the application is an audio application.

* * * * *